United States Patent
Hosaka

[11] Patent Number: 5,897,972
[45] Date of Patent: Apr. 27, 1999

[54] MOLTEN CARBONATE FUEL CELL

[75] Inventor: Minoru Hosaka, Tokyo, Japan

[73] Assignee: Ishikawajima-Harima Heavy Industries Co., Ltd., Tokyo, Japan

[21] Appl. No.: 08/864,189

[22] Filed: May 28, 1997

[30] Foreign Application Priority Data

May 29, 1996 [JP] Japan .................................. 8-134599

[51] Int. Cl.$^6$ .................................................. H01M 8/04
[52] U.S. Cl. .............................. 429/46; 429/12; 429/16; 429/34
[58] Field of Search ................. 429/16, 46, 12, 429/34

[56] References Cited

U.S. PATENT DOCUMENTS 4,714,661 12/1987 Kaun et al. .......................... 429/16 X
5,670,269 9/1997 Hamada et al. ..................... 429/16 X

*Primary Examiner*—John S. Maples
*Attorney, Agent, or Firm*—Griffin, Butler Whisenhunt & Szipl, LLP

[57] ABSTRACT

There is provided a molten carbonate fuel cell including (a) fuel electrodes, (b) air electrodes, and (c) electrolytic plates sandwiched between the fuel and air electrodes, and one of each of the fuel electrodes, the air electrodes and the electrolytic plates cooperating with one another to define a unit cell, the electrolytic plate being formed with a plurality of fine through-holes through which the fuel and air electrodes are in fluid communication with each other, both unreacted gas and gas produced by reaction at the fuel electrode flowing from the fuel electrode to the air electrode through the through-holes. The above mentioned molten carbonate fuel cell provides advantages of no reduction in cell performance which would otherwise be caused by Nernst loss, capability of fuel consumption with high efficiency, no necessity of carbon dioxide gas recycling system, responsibility to rapid fluctuation in load, making a structure of a generating set simpler, and reduction in fabrication costs.

7 Claims, 5 Drawing Sheets

H2  50%
CO  9.2%
CO2 6.1%
H2O 34%

H2  6.2%
CO  3.0%
CO2 38.7%
H2O 51%

O2 7.2%
CO2 10%

O2 5.7%
CO2 7.2%

MOLTEN CARBONATE FUEL CELL

BACKGROUND OF THE INVENTION

1. Field of the Invention

The invention relates to a molten carbonate fuel cell which directly converts chemical energy of fuel into electric energy.

2. Description of the Related Art

As illustrated in FIG. 1, a molten carbonate fuel cell generally includes cells 4, and separators 5 sandwiching the cell 4 therebetween. The cell 4 includes an anode or a fuel electrode 2, a cathode or an air electrode 3, and a thin planar electrolytic plate 1 sandwiched between the fuel and air electrodes 2 and 3. A single cell 4 could provide a low voltage, specifically about 0.8 V. Hence, many cells 4 are piled with the separators 5 being sandwiched between the cells 4, to thereby generate a higher voltage.

Anode gas containing hydrogen is supplied to the fuel electrode 2, and cathode gas containing oxygen is supplied to the air electrode 3 through manifolds (not illustrated). Then, chemical reaction is made to occur at each of the cells 4 at high temperature, specifically at about 650° C. to thereby generate electricity, which is taken out in a direction perpendicular to a plane of each of the cells (namely, a vertical direction in FIG. 1). Electrolyte (molten carbonate) contained in the electrolytic plate 1 is molten at the above mentioned temperature, and wetting between the molten electrolytic plate 1 and the separator 5 ensures gas sealing between the separators 5.

FIG. 2 schematically illustrates a generating set including the above mentioned fuel cell for generating electricity using natural gas as fuel. The illustrated generating set includes a molten carbonate fuel cell 6 (hereinafter, referred to simply as a fuel cell) including a plurality of the cells 4 piled one on another, a reformer 7 using natural gas as fuel, a gas blower 8a, and an air compressor 8b. Natural gas is reformed in a reforming tube in the reformer 7 into anode gas containing hydrogen, and the thus reformed anode gas is supplied to an anode of the fuel cell 6 for generating electricity. Exhaust gas exhausted out of an anode of the fuel cell 6 is burned in a combustion chamber of the reformer 7 to thereby reform natural gas contained in the reforming tube, and resulting exhaust gas is mixed with cathode gas containing oxygen. The gas blower 8a is called a carbon dioxide gas recycling blower, because it supplies carbon dioxide ($CO_2$) produced at an anode to the air electrode.

As illustrated in FIG. 2, anode gas (fuel gas or reformed gas) is supplied into a fuel electrode reaction chamber of the fuel cell 6, and make electrode reaction (anode reaction) at the fuel electrode 2. The resulting exhaust gas is burned, and then supplied into an air electrode reaction chamber together with air. In the air electrode 3, the exhaust gas mixed with air make electrode reaction (cathode reaction), and at the same time remove heat generated in the fuel cell 6. As a result, there is produced high temperature exhaust gas, from which energy is recovered. The above mentioned fuel electrode 2, electrolytic plate 1, and air electrode 3 keep in sufficient contact with one another for providing cell performances. The electrolytic plate 1 is porous so as to sufficiently retain electrolyte therein to thereby prevent occurrence of cross leakage.

FIG. 3 shows an example of gas composition at inlet and outlet ports of each of the cells 4 of the fuel cell 6. In a conventional fuel cell, anode gas is supplied into a fuel electrode reaction chamber through an inlet port (which is located at the left end in FIG. 3), and flows along the fuel electrode 2, while which hydrogen and carbon monoxide (CO) are consumed in anode reaction. Finally, unreacted gas together with reaction products such as $CO_2$ and $H_2O$ is exhausted through an outlet port (which is located at the right end in FIG. 3) of the reaction chamber. Thus, atmospheric fuel concentration at the fuel electrode 2 is decreased with fuel consumption between the inlet and outlet ports, and the thus decreased fuel concentration in turn reduces electro motive voltage. The reduction in electro motive voltage caused by reduction in a fuel concentration is called Nernst loss. A problem is that the greater a fuel utilization rate is, the greater Nernst loss is.

Since carbon dioxide gas is necessary for cathode reaction in the air electrode 3, anode exhaust gas is mixed with air supplied from the air compressor 8b, as mentioned earlier. However, since gas to be supplied to the air electrode is mixed with combustion exhaust gas, the concentration of oxygen and carbon dioxide gas is lower than required in the air electrode, which poses a problem of great Nernst loss, similarly to the fuel electrode.

That is, a conventional molten carbonate fuel cell has a problem that the reduction in cell performances caused by Nernst loss is unavoidable, and thus it is difficult to use fuel with a high utilization rate.

In addition, a generating set including conventional molten carbonate fuel cells therein needs a carbon dioxide gas recycling system for supplying carbon dioxide gas generated at a fuel electrode to an air electrode, as mentioned above. This is accompanied by a problem that load response speed is restricted during transition time in which electricity generation output varies. That is, though an amount of carbon dioxide gas generated at a fuel electrode due to electricity generation is equal to an amount of consumption of carbon dioxide gas at an air electrode, it is quite difficult to operate a generating set in accordance with load fluctuation, because of delay in carbon dioxide gas recycle which is caused by the tube capacity in transition.

In addition, since a generating set including conventional molten carbonate fuel cells therein needs a carbon dioxide gas recycling system therefor, there is a necessity of tubes and blowers, which in turn is accompanied by problems that a generating set cannot avoid having a more complicated structure and costs for fabrication of a generating set are consequently increased.

SUMMARY OF THE INVENTION

In view of the above mentioned problems in the conventional molten carbonate fuel cell, it is an object of the present invention to provide a molten carbonate fuel cell which is capable of avoiding reduction in cell performance which would be caused by Nernst loss, while operating with high fuel utilization rate, and also having the advantages of requiring no carbon dioxide gas recycling system, being responsive to rapid fluctuation in load, making a structure of a generating set simpler, and reducing fabrication costs thereof.

In an embodiment of the present invention, there is provided a molten carbonate fuel cell including (a) fuel electrodes, (b) air electrodes, and (c) electrolytic plates sandwiched between the fuel and air electrodes, and one of each of the fuel electrodes, the air electrodes and the electrolytic plates cooperate with one another to define a unit cell, the electrolytic plate of the unit cell being formed with a plurality of fine through-holes through which the fuel and air electrodes are in fluid communication with each other, both unreacted gas and gas produced by reaction at the fuel electrode of the unit cell flowing from the fuel electrode to the air electrode through the through-holes.

In accordance with the above mentioned molten carbonate fuel cell, both unreacted gas and gas produced by reaction at the fuel electrode of the aforesaid unit cell flow from the fuel electrode to the air electrode through the through-holes formed with the electrolytic plate, and hence all surfaces of the fuel electrode are exposed to fresh fuel, which avoids reduction in cell performances caused by Nernst loss which is in turn caused by reduction in fuel concentration, thereby it being possible to accomplish operation with a high fuel utilization rate.

In addition, since it is possible to supply carbon dioxide gas generated by reaction at the fuel electrode directly to the air electrode through the through-holes formed with the electrolytic plate of the aforesaid unit cell, it is no longer necessary to equip a generating set with a carbon dioxide gas recycling system. Furthermore, since an amount of carbon dioxide gas generated at the fuel electrode by electricity generation is equal to an amount of carbon dioxide gas consumed at the air electrode, it is possible to respond to rapid fluctuation in load. Since a carbon dioxide gas recycling system is no longer necessary, it is possible for a generating set to have a simpler structure, and to reduce fabrication costs.

In a preferred embodiment, flow rate of fuel is controlled in accordance with load output, so that gas produced by reaction at the fuel electrode of the aforesaid unit cell, and gas which was supplied to the fuel electrode but not reacted, flow through the through-holes to generate a pressure difference between the fuel and air electrodes of the unit cell, the pressure difference being equivalent to a pressure loss. This embodiment ensures that a required amount of flow rate of fuel is always supplied to a cell in accordance with output load, to thereby reduce an amount of unreacted fuel gas flowing into the air electrode below a few percent, resulting in operation of the cell with a high fuel utilization rate and depression of production of heat caused by residual combustible gas.

In another preferred embodiment, a pressure at the fuel electrode of the aforesaid unit cell, is kept higher than a pressure at the air electrode in accordance with load output to produce a pressure difference between the fuel and air electrodes, so that gas produced by reaction at the fuel electrode and gas which was supplied to the fuel electrode but not reacted flow through the through-holes due to the pressure difference. This embodiment ensures that the pressure difference is kept almost zero during OCV in which time electricity is not generated to thereby avoid fuel consumption, and the pressure difference is increased in accordance with output power during electricity is being generated, thereby reducing an amount of unreacted fuel gas flowing into the air electrode below a few percent, resulting in operation of the cell with a high fuel utilization rate and depression of production of heat caused by residual combustible gas.

In still another preferred embodiment, the fuel electrode of the aforesaid unit cell, is provided with catalyst for reforming, gas reformed by the catalyst together with unreacted gas and gas produced by reaction at the fuel electrode flowing from the fuel electrode to the air electrode through the through-holes. In accordance with the embodiment, it is possible for an internal reform type fuel cell to have a simpler structure, resulting in that it is no longer necessary for a generating set to have an external reformer, and hence a generating set can have a simpler structure.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
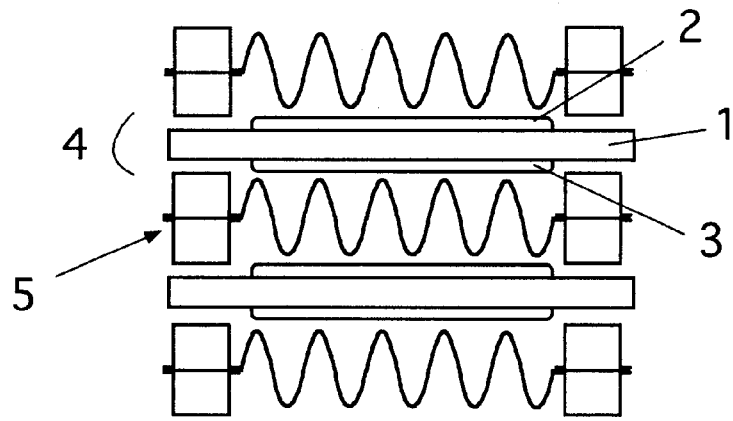
FIG. 1 is a schematic view illustrating a general molten carbonate fuel cell.
Figure 2:
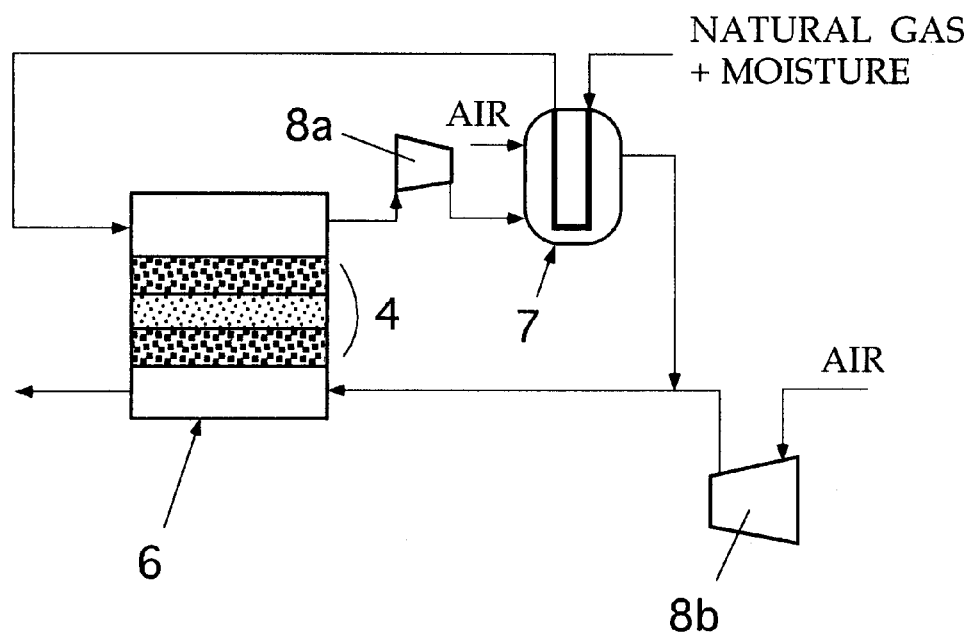
FIG. 2 is a schematic view illustrating a conventional generating set using natural gas as fuel.
Figure 3:
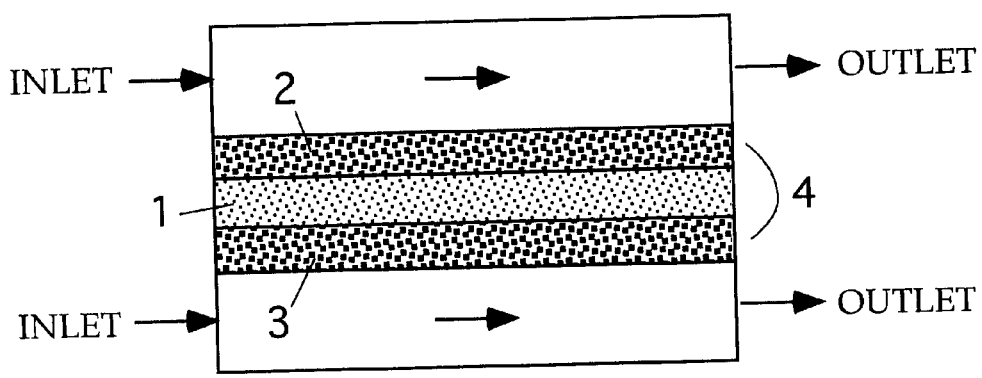
FIG. 3 is a schematic view of a conventional fuel cell, showing gas composition at inlet and outlet ports of the fuel cell.
Figure 4:
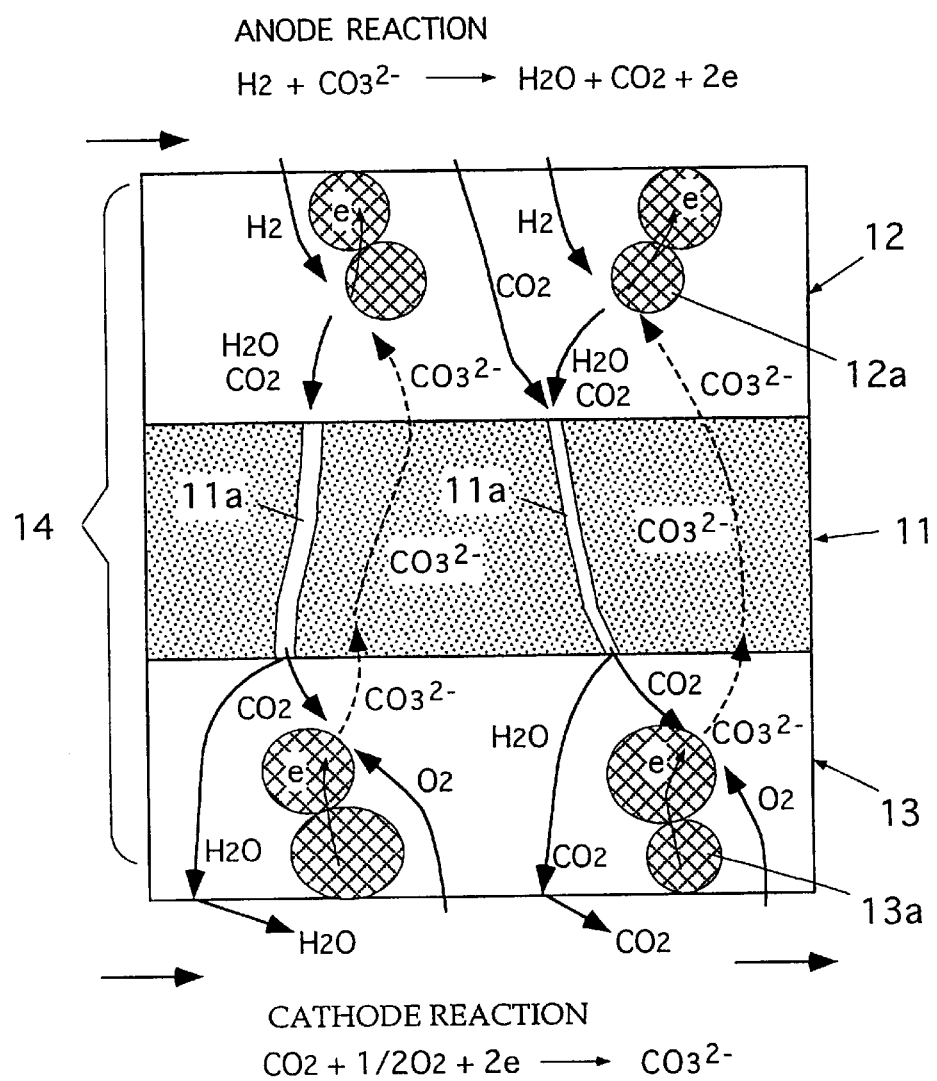
FIG. 4 is a schematic view illustrating an internal structure of a molten carbonate fuel cell in accordance with the present invention.

FIG. 4 illustrates an internal structure of a molten carbonate fuel cell in accordance with the present invention. As illustrated, a molten carbonate fuel cell in accordance with the present invention includes a cell 14 comprising a fuel electrode 12, an air electrode 13, and a electrolytic plate 11 sandwiched between the fuel and air electrodes 12 and 13. The electrolytic plate 11 is formed with a plurality of fine through-holes 11a through which the fuel and air electrodes 12 and 13 are in fluid communication with each other. Thus, both unreacted gas and gas produced by reaction at the fuel electrode 12 flow from the fuel electrode 12 to the air electrode 13 through the through-holes 11a.

As mentioned earlier, it is necessary to expose an entire surface of the fuel electrode 12 to fresh fuel in order to reduce Nernst loss which would be caused at the fuel electrode 12. To this end, the electrolytic plate 11 is formed with a plurality of the fine through-holes 11a, unlike a conventional electrolytic plate acting merely as a partition wall for separating fuel and air electrodes from each other, to thereby make it possible for unreacted gas and gas produced by reaction at the fuel electrode 12 to flow from the fuel electrode 12 to the air electrode 13. The fuel and air electrodes 12 and 13 are originally porous. Thus, gas flows directly through the electrolytic plate 11 by forming the electrolytic plate 11 with the through-holes 11a and producing a pressure difference between the fuel and air electrodes 12 and 13.

As illustrated in FIG. 4, hydrogen ($H_2$) reacts with carbonic acid ion ($CO_3^{2-}$) to thereby generate moisture ($H_2O$) and carbon dioxide ($CO_2$) in anode reaction occurring at the fuel electrode 12. The thus generated moisture and carbon dioxide are supplied directly to the air electrode 13 through the through-holes 11a of the electrolytic plate 11. Oxygen ($O_2$) contained in cathode gas reacts with carbon dioxide ($CO_2$) to thereby carbonic acid ion ($CO_3^{2-}$) in cathode reaction occurring at the air electrode 13. The carbonic ion is supplied directly to the fuel electrode 12 through electrolyte of the electrolytic plate 11. Thus, in accordance with the present embodiment, carbonic acid ion which is required for anode reaction and carbon dioxide gas which is required for cathode reaction are in direct circulation within the cell 14. In FIG. 4, particles of which the fuel and air electrodes 12 and 13 are formed are represented with circles 12a and 13a, through which electrons move to thereby generate electricity.

In the reaction at the fuel electrode 12 in FIG. 4, the fuel electrode receives fuel gas, namely hydrogen and carbon monoxide, from a flow path and also receives carbonic acid ion from a electrolyte, and cause them to react with each other therein, similarly to a conventional fuel electrode. Whereas reaction products and unreacted gas are conventionally returned to a fuel electrode flow path, they flow through the fine through-holes 11a of the electrolytic plate and reach the air electrode 13 in the present embodiment. Thus, gas flow is always unidirectional, and hence a surface of the fuel electrode 12 is always exposed to fresh fuel having a high concentration, resulting in reduction in Nernst loss. In the embodiment, it is prefer to prevent rich gas to flow to the air electrode 13 by keeping high fuel utilization rate.

In the reaction at the air electrode 13, highly concentrated carbon dioxide gas coming through the fine through-holes 11a of the electrolytic plate 11 and oxygen gas coming through a flow path of the air electrode react with each other in the porous air electrode to thereby generate carbonic acid ion required for the reaction at the fuel electrode 12. Unburnt fuel flowing through the fine through-holes 11a of the electrolytic plate 11 is burnt in the air electrode 13, but the burning of unburnt fuel exerts a slight influence on the cell 14 because the cell 14 is in operation with a high fuel utilization rate and the unburnt fuel is burnt in a condition that the unburnt fuel is made lean over an entire surface of the air electrode. In comparison with a conventional fuel cell, since it is possible to increase a concentration of reaction gas, in particular a concentration of carbon dioxide gas, Nernst loss can be reduced also in the air electrode 13.

In order to form the electrolytic plate 11 with a plurality of the fine through-holes 11a, coarse particles may be mixed into the electrolytic plate 11 or pore former may be introduced into the electrolytic plate 11. Pore former includes polymer which is vaporized by heating, and thus cavities or through-holes 11a can be formed by vaporizing the pore former when the fuel cell is heated. For instance, if the fine through-holes 11a having a diameter of 100 μm occupies about 5% in pore volume in the electrolytic plate 11, load of one atom, that is 150 mA/cm$^2$ acts as water head of about 1 meter.

Figure 5A:
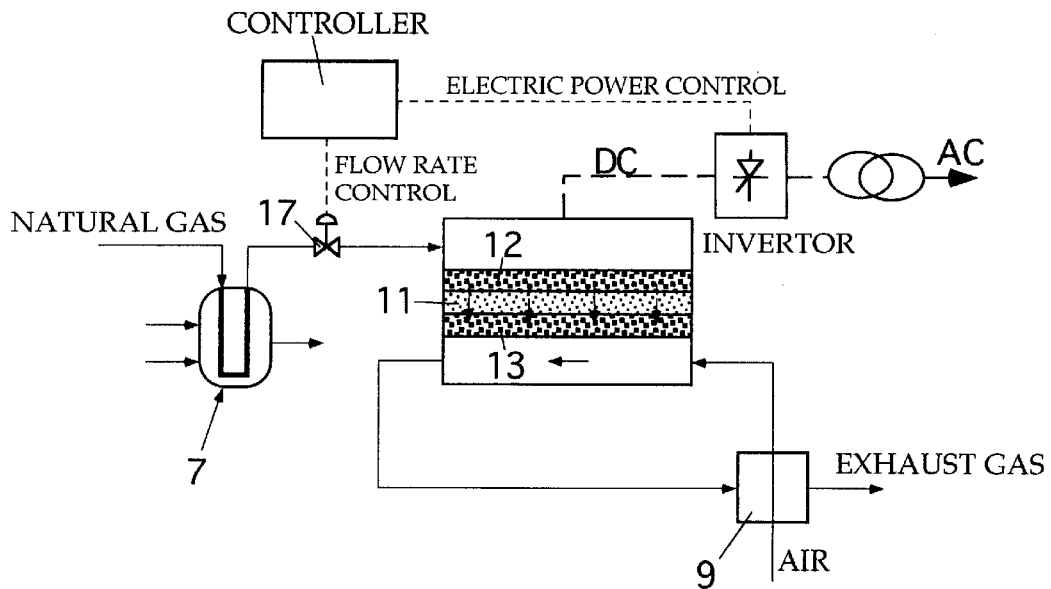
FIG. 5A is a schematic view illustrating a generating set including a molten carbonate fuel cell in accordance with the present invention.
Figure 5B:
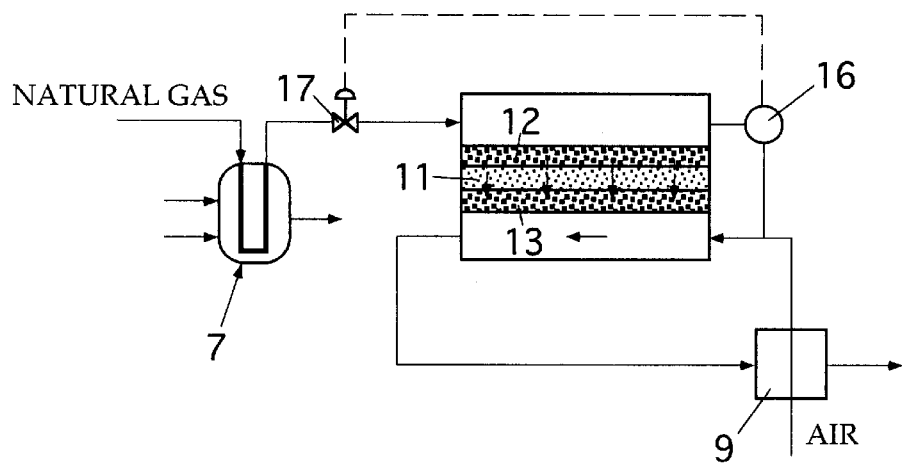
FIG. 5B is a schematic view illustrating another generating set including a molten carbonate fuel cell in accordance with the present invention.

FIGS. 5A and 5B illustrate generating sets including a molten carbonate fuel cell in accordance with the present invention. As illustrated, a molten carbonate fuel cell in accordance with the present invention has no outlet port for gas (anode exhaust gas) passing through a reaction chamber of the fuel electrode to be discharged therethrough, and hence exhaust gas is not discharged from the fuel electrode. The entire amount of gas supplied to the fuel electrode including gas produced by reaction at the fuel electrode and unreacted gas which was supplied to the fuel electrode, but not reacted, is made to flow into a cathode through a plurality of the fine through-holes 11a formed with the electrolytic plate 11.

As illustrated in FIG. 5A, a flow rate of fuel is controlled by a fuel flow rate adjust valve 17 in accordance with load output to thereby flow gas produced by reaction at the fuel electrode and unreacted gas which was supplied to the fuel electrode, but not reacted, into a cathode through a plurality of the fine through-holes 11a formed with the electrolytic plate 11.

As an alternative, as illustrated in FIG. 5B, a generating set may include a differential pressure gage 16 for detecting a differential pressure between the fuel and air electrodes, and a flow rate adjust valve 17 for controlling an amount of gas in accordance with outputs of the differential pressure gage 16. In the illustrated generating set, a pressure at the fuel electrode is kept higher than a pressure at the air electrode, and gas in an amount to be determined in accordance with load output can be flown into the air electrode from the fuel electrode due to a pressure difference between the fuel and air electrodes.

Thus, it is ensured that a pressure difference between the fuel and air electrodes is kept almost zero during OCV in which time electricity is not generated to thereby avoid fuel consumption, and the pressure difference is increased in accordance with output power during electricity is being generated, thereby reducing an amount of unreacted fuel gas flowing into the air electrode below a few percent, resulting in operation of the cell with a high fuel utilization rate and depression of production of heat caused by residual combustible gas.

Figure 6:
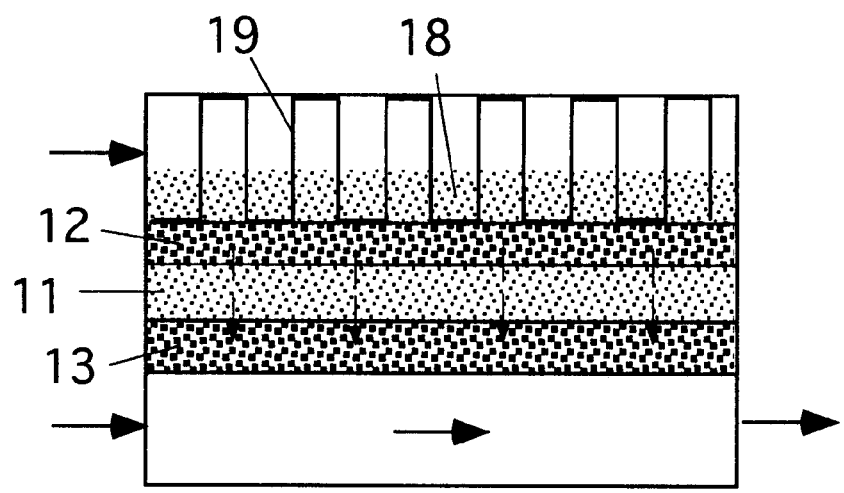
FIG. 6 is a schematic view illustrating a molten carbonate fuel cell in accordance with another embodiment of the present invention.

FIG. 6 illustrates a molten carbonate fuel cell in accordance with another embodiment of the present invention. As schematically illustrated, the fuel cell is provided at the fuel electrode 12 thereof with a porous flow path plate 19 and catalyst 18 for reforming. Generated electricity is taken out through the porous flow path plate 19. Gas reformed by the catalyst 18 together with unreacted gas and gas produced by reaction at the fuel electrode 12 is made to flow from the fuel electrode 12 to the air electrode 13 through the through-holes 11a. Thus, it is possible to accomplish an internal reform type fuel cell which has a simple structure and which does not need to have an external reformer, which in turn enables a generating set to have a simpler structure.

It should be noted that the present invention is able to be applied to not only a molten carbonate fuel cell, but also other types of fuel cells.

As mentioned so far, a molten carbonate fuel cell in accordance with the present invention is characterized by that (a) Nernst loss is reduced with the result of improvement in cell performances, (b) a carbon dioxide gas recycling system is no longer necessary, and there is no delay in supply of carbon dioxide gas, resulting in that the fuel cell can be readily run, (c) since the fuel cell is of percolation type, the fuel cell can be readily controlled, (d) it is possible to run the fuel cell with high fuel utilization rate, (e) it is possible to form a cell in a simpler structure with the result of cost reduction, and (f) a molten carbonate fuel cell in accordance with the present invention can be applied to an internally reforming type fuel cell.

That is, a molten carbonate fuel cell in accordance with the present invention provides advantages of no reduction in cell performance which otherwise would be caused by Nernst loss if not prevented by this present invention, capability of fuel consumption with high efficiency, no necessity of carbon dioxide gas recycling system, responsibility to rapid fluctuation in load, making a structure of a generating set simpler, and reduction in fabrication costs.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A molten carbonate fuel cell comprising:
   (a) fuel electrodes;
   (b) air electrodes; and
   (c) electrolytic plates sandwiched between said fuel electrodes and said air electrodes;
   one of said fuel electrodes, one of said air electrodes, and one of said electrolytic plates cooperating with one another to define a unit cell, wherein said one of said electrolytic plates being formed with a plurality of fine through-holes through which said one of said fuel electrodes and said one of said air electrodes are in fluid communication with each other, both unreacted gas and gas produced by reaction at said one of said fuel electrodes flowing from said one of said fuel electrodes to said one of said air electrodes through said through-holes.

2. The molten carbonate fuel cell as set forth in claim 1, wherein flow rate of fuel is controlled in accordance with output load, so that gas produced by reaction at said one of said fuel electrodes and gas which was supplied to said one of said fuel electrodes but not reacted flow through said through-holes to generate a pressure difference between said one of said fuel electrodes and said one of said air electrodes, said pressure difference being equivalent to a pressure loss.

3. The molten carbonate fuel cell as set forth in claim 1, wherein a pressure at said one of said fuel electrodes is kept higher than a pressure at said one of said air electrodes in accordance with load output to produce a pressure difference between said one of said fuel electrodes and said one of said air electrodes, so that gas produced by reaction at said one of said fuel electrodes and gas which was supplied to said one of said fuel electrodes but not reacted flow through said through-holes due to said pressure difference.

4. The molten carbonate fuel cell as set forth in claim 1, wherein said one of said fuel electrodes is provided with catalyst for reforming, and wherein gas reformed by said catalyst flows, together with unreacted gas and gas produced by reaction at said one of said fuel electrodes, from said one of said fuel electrodes to said one of said air electrodes through said through-holes.

5. The molten carbonate cell as set forth in claim 1, wherein said through-holes have a diameter of 100 $\mu$m.

6. The molten carbonate cell as set forth in claim 1, wherein said one of said electrolytic plates has a pore volume of 5%.

7. The molten carbonate cell as set forth in claim 1, wherein said through-holes have a diameter of 100 $\mu$m and said one of said electrolytic plates has a pore volume of 5%.

* * * * *